Figure 1:
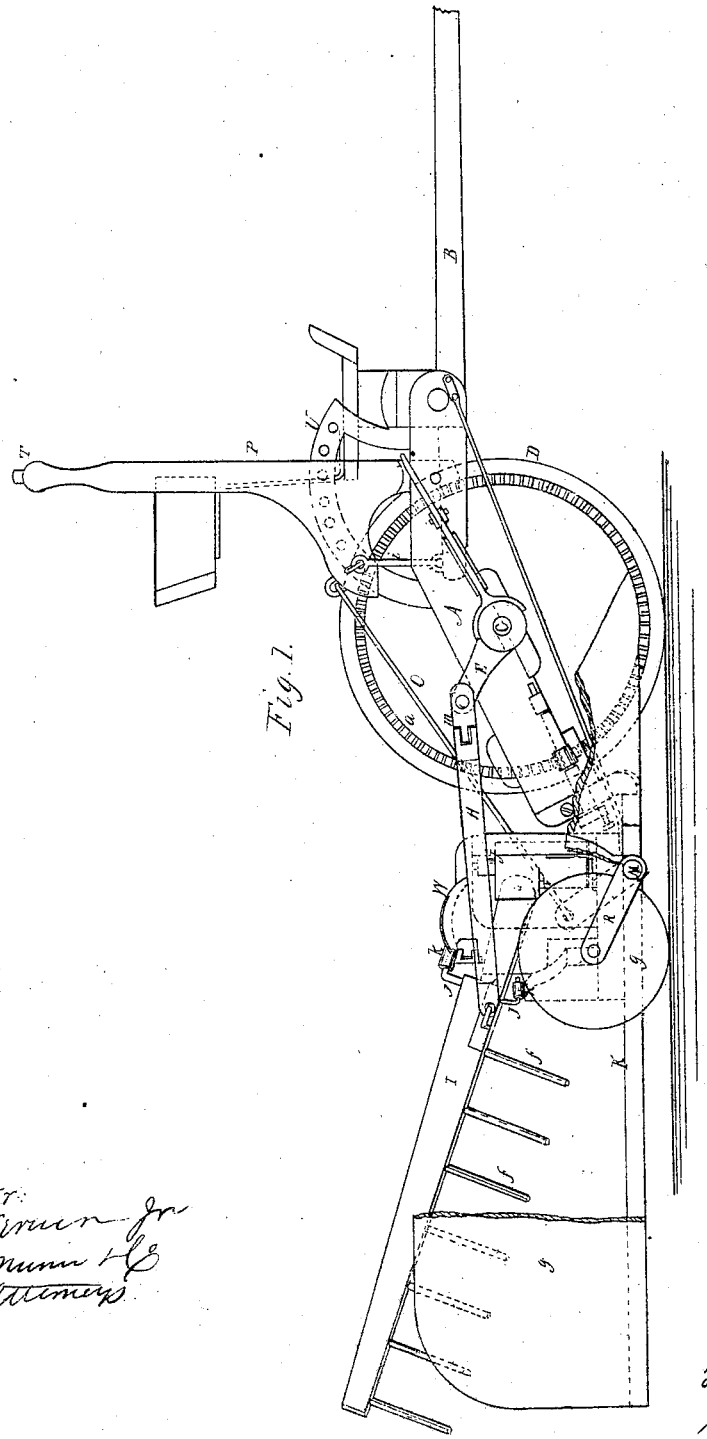

2 Sheets Sheet 1

J. Werner, Jr.
Harvester Rake.
N° 50191    Patented Sep. 26, 1865.

Inventor:
John Werner Jr
per Munn & Co
Attorneys

Witnesses:
Theo Tusch
C. L. Topliff

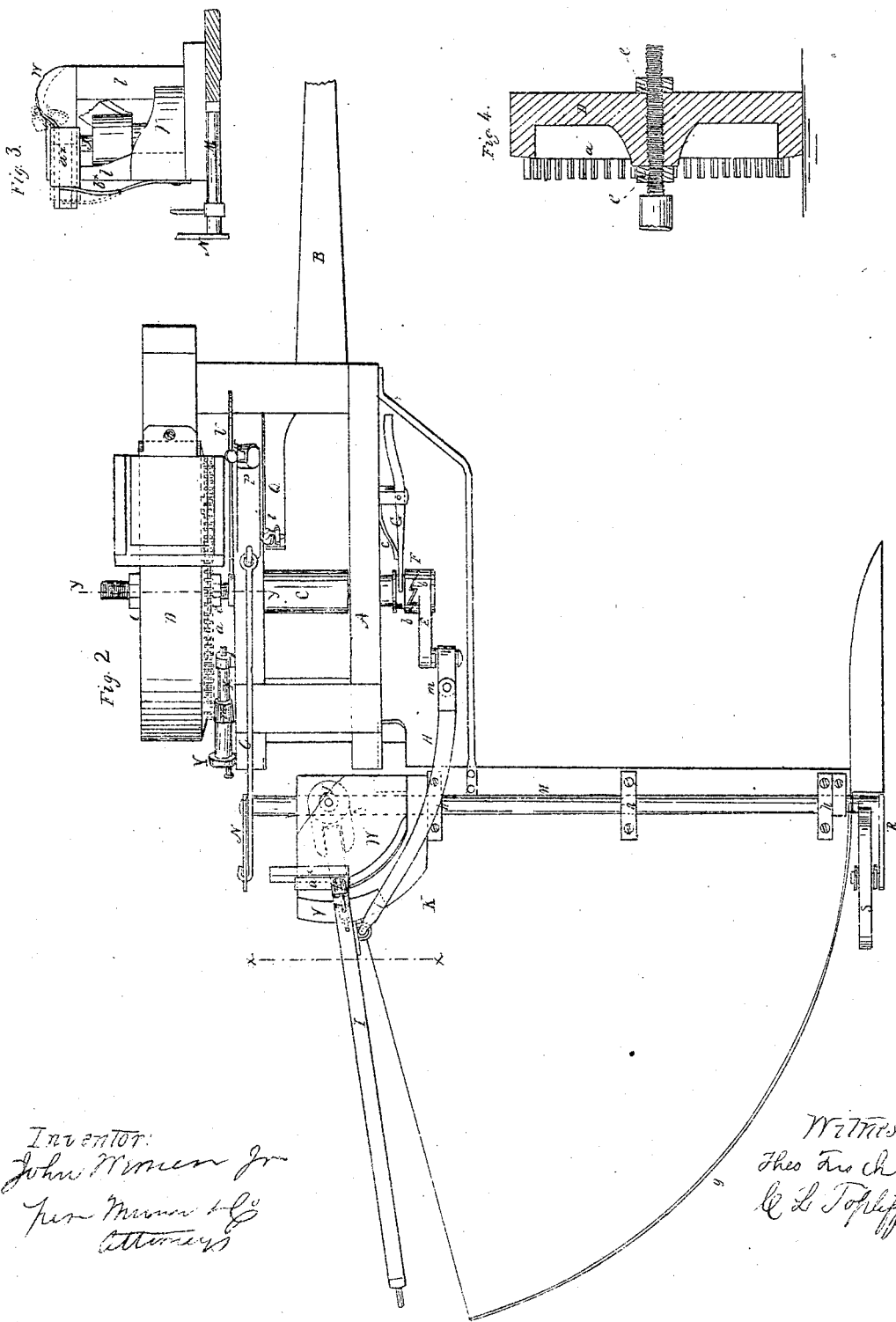
J. Werner, Jr.
Harvester Rake.
N°50191. Patented Sep. 26, 1865.

UNITED STATES PATENT OFFICE.

JOHN WERNER, JR., OF PRAIRIE DU SAC, WISCONSIN.

IMPROVEMENT IN HARVESTING-MACHINES.

Specification forming part of Letters Patent No. 50,191, dated September 26, 1865.

*To all whom it may concern:*

Be it known that I, JOHN WERNER, Jr., of Prairie du Sac, in the county of Sauk and State of Wisconsin, have invented a new and Improved Reaping and Mowing Machine; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, a plan or top view of the same; Fig. 3, a vertical section of a portion of the same, taken in the line $x\,x$, Fig. 2; Fig. 4, a vertical section of a portion of the same, taken in the line $y\,y$, Fig. 2.

Similar letters of reference indicate like parts.

This invention relates to a new and improved means for adjusting the sickle to any desired height; and, further, to a means employed for admitting of the speed of the sickle being varied as may be required.

A represents the main frame of the machine, to the front end of which the draft-pole B is secured, the latter being attached to a shaft, the journals of which are allowed to turn freely in the frame A.

C is a shaft which is placed transversely in the frame A, and has a driving-wheel, D, at one end of it, said wheel being at the left-hand side of the main frame, and having teeth $a$ at its inner side. On the inner end of the shaft C there is placed loosely an arm, E, which may be connected with the shaft, when necessary, by means of an ordinary ratchet-clutch, F, the sliding part $b$ of the latter being disconnected with the part $b'$ by means of a lever, G, which has a spring, $c$, bearing against it to keep the part $b$ engaged with $b'$, and consequently keep the arm E connected with the shaft C. (See Fig. 2.)

The driving-wheel D is fitted on a screw, $d$, at the outer end of the shaft C, and is secured on said screw by means of two jam-nuts, $e\,e$. (Shown clearly in Fig. 4.)

The outer end of the arm E is connected by a rod, H, with a rake-head, I, which works on a vertical pin, J, the latter being attached to the platform K at the rear of the main frame A. This rake-head is provided with teeth $f$, of usual construction, and the rake sweeps over the platform from the pin J as a center, the platform being of sector shape, and provided at its curved edge with a vertical plate, $g$, to serve as a fender or guard. The platform is firmly secured to rear of frame A.

At the front end of the platform K, between it and the finger-bar L, there is fitted a shaft, M, which is allowed to turn freely in its bearings $h$. The end of this shaft at the rear of the driving-wheel D has an arm, N, attached to it, and the end of this arm is connected by a rod, O, with a lever, P, at the front part of the main frame A. This lever P is also connected by a rod, $i$, with an arm, Q, which projects from the rear of the shaft, to which the draft-pole B is attached. At the outer end of the shaft M there is an arm, R, the outer end of which is fitted on the axle of a wheel, S, which supports the outer or grain end of the platform K.

The lever P has a rod, T, attached to it, with a bent lower end to form a pin to fit into any one of a series of holes in a segment-plate, U, attached to the main frame. By means of this rod and perforated segment-plate the lever P may be held at any desired point within the scope of its movement, and the front end of the platform and sickle retained at a greater or less height, according to the distance it is required to cut the grain above the surface of the ground, for it will be seen that by moving the lever P the shaft M is turned, and the arm R, which is attached to the axle of the grain-wheel S, will raise the outer or grain end of the platform, while the connection between the lever P and arm Q at the rear of the draft-pole will cause the opposite end of the platform to be raised.

The rake-head I has two arms, $j\,j$, attached to it, one at is upper and the other at its lower surface, and these arms are each provided with a friction-roller, $k$, both of which are shown in Fig. 1.

V is a fixed inclined plane of curved form, which is at the front end of the platform K, the curve being a part of a circle, of which the pin J of the rake-head is the center. (See Fig. 2.)

W is a fixed curved way, which is, at the upper ends of supports $l\,l$, attached to the platform.

The lower roller $k$ passes up the curved inclined plane V as it approaches the termination of its backward movement, and the upper roller $k$ catches upon the way W during the forward movement of the rake and keeps the rake elevated above the platform and the cut grain thereon until it reaches the termination of its forward movement, at which point it falls upon the front of the platform, and during its backward movement sweeps the cut grain therefrom, the rake rising as the lower roller $k$ passes up the curved inclined plane V to cause the upper roller $k$ to pass upon the elevated way W. The upper roller $k$, in passing upon the elevated way W, shoves aside a small slide, $a^\times$, which serves as a guide to cause said roller to pass upon the way, the slide $a^\times$ being forced back by a spring, $b^\times$, as soon as the roller $k$ passes upon it. This reciprocating motion is given the rake by means of the arm E and rod H, the latter being provided with a joint, $m$, which admits of a lateral bending or working of said rod.

X is a small shaft placed longitudinally at the left-hand side of the main frame A, and having a pinion, $m'$, upon it which gears into the teeth $a$ of the wheel D, the rear end of the shaft X having a crank-pulley, Y, upon it, from which the sickle is driven by an ordinary connecting-rod. The motion or speed of the sickle may be varied as desired by placing pinions $m'$ of different sizes on shaft X, the wheel D, in consequence of being fitted and secured on the screw $d$ by jam-nuts $e\ e$, admitting of the wheel D being adjusted to effect this result.

Having thus described my invention, I claim as new and desire to secure by Letters Patent—

1. The shaft M, provided at one end with an arm, R, attached to the axle of a grain-wheel, S, and provided at its opposite end with an arm, N, connected by a rod, O, with a lever, P, on the main frame A, which lever is connected by a rod, $i$, with an arm, Q, at the rear of the draft-pole B, substantially as and for the purpose set forth.

2. The securing of the wheel D to its shaft C by means of the screw $d$ and jam-nuts $e\ e$, substantially as and for the purpose specified.

JOHN WERNER, Jr.

Witnesses:
   D. R. BAXTER,
   DANIEL BAXTER.